United States Patent [19]

Wang et al.

[11] Patent Number: 5,659,167
[45] Date of Patent: Aug. 19, 1997

[54] VISUALLY INTERACTIVE DECODING OF DATAFORMS

[75] Inventors: Ynjiun P. Wang, Fort Myers, Fla.; Robert F. Meyerson, Akron, Ohio

[73] Assignee: Metanetics Corporation, Fort Myers, Fla.

[21] Appl. No.: 567,902

[22] Filed: Dec. 6, 1995

Related U.S. Application Data

[62] Division of Ser. No. 222,855, Apr. 5, 1994, Pat. No. 5,513, 264.

[51] Int. Cl.$^6$ .................................................. G06K 7/10
[52] U.S. Cl. ............................................ 235/472; 235/462
[58] Field of Search ........................................ 235/462, 472

[56] References Cited

U.S. PATENT DOCUMENTS

| | | |
|---|---|---|
| 4,044,227 | 8/1977 | Holm et al. |
| 5,181,823 | 1/1993 | Hussey et al. |
| 5,189,289 | 2/1993 | Watanabe ............... 235/462 |
| 5,324,924 | 6/1994 | Cai et al. ................. 235/462 |
| 5,331,176 | 7/1994 | Sant' Anselmo et al. ..... 235/472 |
| 5,414,251 | 5/1995 | Durbin .................... 235/462 |
| 5,428,212 | 6/1995 | Tani et al. ............... 235/472 |
| 5,430,283 | 7/1995 | Tanaka .................... 235/462 |
| 5,457,309 | 10/1995 | Pelton ................... 235/462 |
| 5,471,041 | 11/1995 | Inoue et al. ............. 235/462 |
| 5,481,098 | 1/1996 | Davis et al. ............. 235/462 |
| 5,500,516 | 3/1996 | Durbin ................... 235/472 |

FOREIGN PATENT DOCUMENTS

1100684  4/1989  Japan.

*Primary Examiner*—Donald T. Hajec
*Assistant Examiner*—Mark S. Tremblay
*Attorney, Agent, or Firm*—Kenneth P. Robinson

[57] ABSTRACT

Interactive decoding of machine readable dataforms provides improved control of decoding avoiding inaccurate reading of dataforms. While data is entered (12) and encoded (14) an image of the resulting dataform, such as a data code matrix or two-dimensional bar code, is displayed (16) and continuously updated as the dataform (20) fills with entered data. Using the display (16) and an input unit (12) such as a keyboard, digitizer or scanner, data can be edited to add, modify or delete data while observing the resulting dataform (20). On completion, the final dataform code signals are provided for further use (24) or a copy of the dataform (20) is provided by printing, for example. During decoding, an image of the dataform (20) as captured by a reader (32), such as a laser scanner, CCD matrix or CMOS camera, is displayed (34). Observing the display (34), the operator can determine if the image is too small, out of focus, partially out of view, etc., and take action (33) to improve the reader (32) performance. The dataform (20) is then decoded (36) with improved accuracy and data signals are displayed or printed out (40) or provided for further use (38). Automated image monitoring and reader adjustment is also described. Methods and systems for interactive decoding of dataforms are described.

9 Claims, 5 Drawing Sheets

This i ⟶ This is ⟶ This is data showing ⟶ This is data

FIG. 5a      FIG. 5b      FIG. 5c      FIG. 5d This i      This is      This is data showing      This is data FIG. 6a      FIG. 6b      FIG. 6c      FIG. 6d

VISUALLY INTERACTIVE DECODING OF DATAFORMS

This is a division of application Ser. No. 08/222,855, filed Apr. 5, 1994, now U.S. Pat. No. 5,513,264 issued Apr. 30, 1996, which is directed to visually interactive encoding of dataforms.

This invention relates to decoding of machine readable dataforms, such as printed two-dimensional bar codes and matrix codes, and more particularly to methods and systems providing visual interaction during such decoding.

BACKGROUND OF THE INVENTION

The use in diverse applications of bar codes (one-dimensional, such as UPC, Code 39, Code 128; two-dimensional, such as PDF 417, Code 49, Code 16K; etc.), matrix codes (Data Code, Code 1, Vericode, MaxiCode, etc.) and graphic codes (Glyph, etc.) which may be printed or etched on paper, plastic cards and metallic and other items is well known. In addition to such optically machine readable graphics, data is commonly recorded in other machine readable forms, such as optically via invisible ink bar codes or matrix codes and magnetically via magnetic stripes or magnetic ink MICR fonts, on credit cards, checks and identification badges. Similarly, data is recorded electro-magnetically via RF tags in a growing variety of forms and applications. In addition to printing, etching and magnetic recording, other methods of forming or transferring dataforms include engraving, ion doping (for semiconductor wafers), stamping, tattooing (for skin), biochemical binding, etc. For present purposes, all arrangements whereby data in some form adapted to be machine readable is fixed in a copy are termed "dataforms".

In present usage, the encoding process for dataforms is carried out in what may be termed a "batch mode". That is, users key-in or otherwise enter the data as a first step and then send or transmit the data to an encoder to be encoded in a machine readable dataform. As a result, the user has no advance knowledge as to important characteristics of the presentation of the actual data in the dataform. Thus, the user or operator of the encoding equipment does not know whether all the data can be encompassed within the dataform in point, and is not aware in advance of the overall appropriateness of inclusion of the data into the required format in a single dataform, or whether use of two or more dataforms would be more appropriate for the best presentation of the particular data at hand. Also the operator is unable to evaluate factors such as final dataform dimensions and resolution, data format and error correction level most appropriate for the dataform being coded. As a result, the user is left to the approach of entering and encoding data and examining the resulting coded dataform. A further trial and error approach may then be necessary in order to arrive at an optimal or acceptable encoding format. For the next different batch of data the same trial and error approach must be followed even if the coded dataforms are being output in a printed or similar visually observable form. Of course, if the output datacodes are encoded in a magnetic, invisible ink or other medium in a non-visual format it is even more difficult for the operator to monitor the encoding process to determine the encoding parameters appropriate for optimal, or even merely acceptable, dataform coding and presentation.

On the decoding side, prior decoding systems (using a hand-held scanner, for example) are dependent on the user placing the scanner with an appropriate positioning and spacing from the dataform to be decoded (a bar code, for example). However, there is typically no provision for permitting confirmation of positioning or spacing. As a result, the bar code may be only partially within the scanner field of view, may be significantly off center or out of focus, or may be too far away from the scanner, any of which may result in a small or otherwise inadequate image causing reduced accuracy of reading, or partial or complete failure to read the dataform. Again, a trial and error approach may be necessary to accomplish accurate reading of the dataform after one or more repeated attempts, particularly where magnetic, invisible ink or other non-visual formats are involved.

As examples of prior patents which describe encoding and decoding systems (but which do not provide visually interactive methods or systems so as to avoid the potential need for trial and error repetition) attention is directed to the following. U.S. Pat. Nos. 5,113,445 and 5,243,655 cover two-dimensional bar code encoding and decoding inventions of a present applicant. Earlier U.S. Pat. No. 4,939,354 covers production and reading of two-dimensional data code machine readable matrices.

Objects of the present invention are, therefore, to provide new and improved systems and methods for decoding machine readable dataforms which avoid one or more disadvantages of prior such systems and methods, and to provide dataform decoding systems and methods providing benefits of visual or automated interaction during decoding.

SUMMARY OF THE INVENTION

In accordance with the invention a method for decoding a machine readable dataform, includes the steps of:
 (p) utilizing a reader to read at least a portion of a dataform fixed in a machine readable copy, to provide electrical signals representative of at least such portion of the dataform;
 (q) viewing a dynamic display providing a visual image of at least such portion of the dataform, in response to the step (p) electrical signals;
 (r) in view of such visual image implementing one of the following (i) changing the reading relationship between the reader and the dataform and (ii) activation of decoding via step (t);
 (s) in response to a change in the reading relationship, repeating steps (p), (q) and (r); and
 (t) in response to activation of decoding, decoding the step (p) electrical signals to provide data output signals representative of entry data encoded in the dataform.

Also in accordance with the invention, a decoding system, enabling interactive decoding of machine readable dataforms, includes a reader unit having at least one adjustable reading performance characteristic and arranged to read a dataform fixed in a machine readable copy and provide electrical signals representative of the dataform. An image unit is arranged to display a dynamic image of the dataform in response to the electrical signals, such dynamic image enabling interactive monitoring of initial and adjusted reading performance characteristics of the reader unit relative to the dataform. The decoding system further includes a decoding unit arranged to decode the electrical signals to provide output signals representative of the data encoded in the dataform.

For a better understanding of the invention, together with other and further objects, reference is made to the accompanying drawings and the scope of the invention will be pointed out in the accompanying claims.

DESCRIPTION OF THE INVENTION

Figure 1:
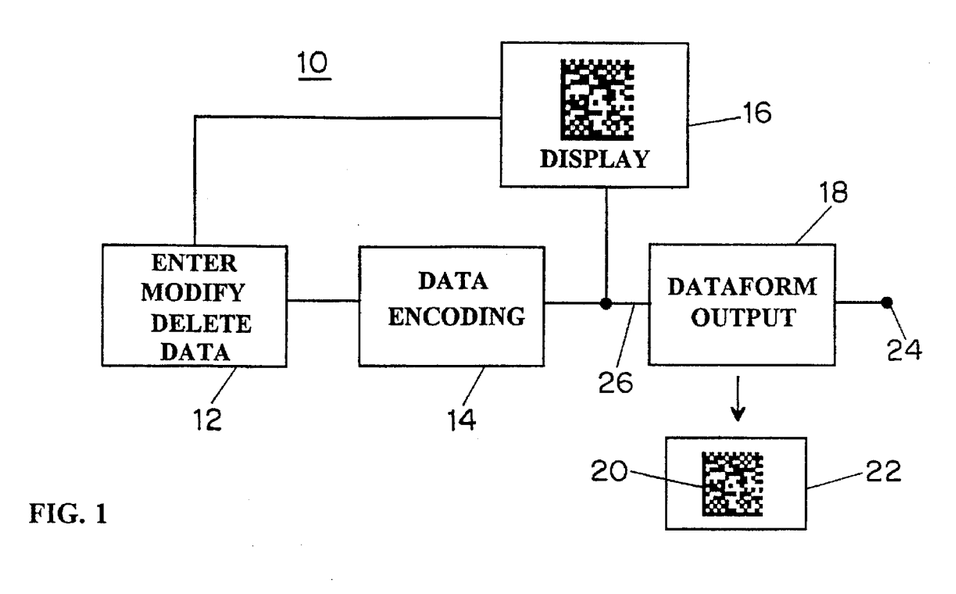
FIG. 1 is a block diagram of a visually interactive system for encoding machine readable dataforms in accordance with the invention.

FIG. 1 illustrates a form of visually interactive encoding system 10 for encoding machine readable dataforms in accordance with the invention. As noted above, a "dataform" is defined for present purposes as data in some form adapted to be machine readable which is fixed in a copy. Such copy may take the form of a printed graphic image, a recording of a magnetic strip, an etching on a component, an image recorded on film, etc.

As shown, the FIG. 1 system 10 includes data entry unit 12 arranged to enable entry data to be entered in successive portions. Data entry unit 12, which may include a keyboard as well as an optical character reader, card reader, voice recognizer, digitizer, stylus (pen-based input) and other means for data entry, is arranged to also enable entry data to be added, modified, deleted and thereby edited as appropriate.

Encoding system 10 also includes encoding unit 14 arranged to encode entry data into code signals representative of a machine readable dataform, such as a one-dimensional bar code or the two-dimensional bar code or matrix code described in the patents referenced above. These latter codes will be discussed further with reference to FIGS. 5 and 6. In a preferred embodiment encoding unit 14 provides the further capability of encoding the entry data into code signals representative of two or more different dataforms and being switchable between the different dataforms at any time.

Figure 5A:
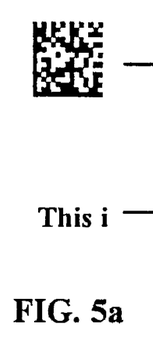
FIGS. 5a–5d illustrate interactive encoding of a matrix code.

Display unit 16 of FIG. 1 is arranged to display a visual representation of the dataform in response to the code signals provided by encoding unit 14. As will be discussed further, the visual representation of the dataform enables the encoding system user or operator to take advantage of the add/modify/delete entry data capabilities of unit 12 in order to achieve optimal or acceptable composition, form and sizing of the dataform. As shown, display unit 16 also receives entry data signals from unit 12 and displays the entry data, in alpha-numeric, symbolic or other initial form, along with the dataform representations. A dataform above text presentation is illustrated in FIG. 5a, for example. Display unit 16 typically includes a cathode ray tube (CRT), liquid crystal display, plasma display or other form of display.

The encoding system 10 further includes a code output, shown as code output unit 18. Output unit 18 typically comprises one or more of the following: a bar code printer for printing bar codes on documents or plastic cards, a device for producing identification cards, a device for etching bar codes on metal parts, a film recorder, an invisible bar code printer, or a device for coupling code signals representative of a final bar code configuration to an output terminal for transmission to a facsimile machine, computer, speaker, RF transmitter, or other unit arranged to further utilize such code signals. In FIG. 1, code output unit 18 is represented as providing a dataform fixed in a machine readable copy, such as a graphic image 20 on a card 22, and also providing a code signal output shown as output port 24. If no fixed copy of the dataform is required in a particular embodiment, the code output may consist simply of code output port 26, at which code signals are made available from encoding unit 14 at the completion of data entry and finalization of editing of the dataform.

Figure 2:
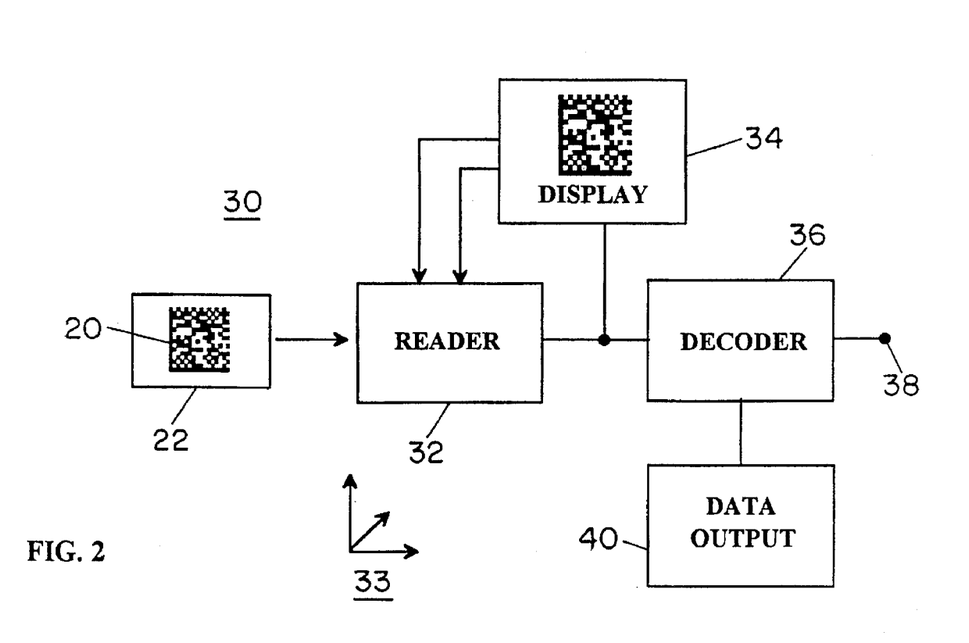
FIG 2 is a block diagram of a visually interactive system for decoding machine readable dataforms in accordance with the invention.

Referring now to FIG. 2, there is illustrated a form of visually interactive decoding system 30 for decoding machine readable dataforms in accordance with the invention. Card 22 bearing dataform 20 is shown at the left of FIG. 2. Decoding system 30 includes a reader unit 32 arranged to read the dataform 20 to provide electrical signals representative thereof. Reader unit 32 typically comprises a bar code scanner using established laser reflection or charge coupled device (CCD) array technology, a CMOS camera or other suitable device for providing electrical signals representative of the dataform. As indicated at 33, reader 32 is arranged to permit a variety of position, focus and other adjustments in order to adjust reading performance characteristics to achieve accurate results in reading dataforms.

Figure 3A:
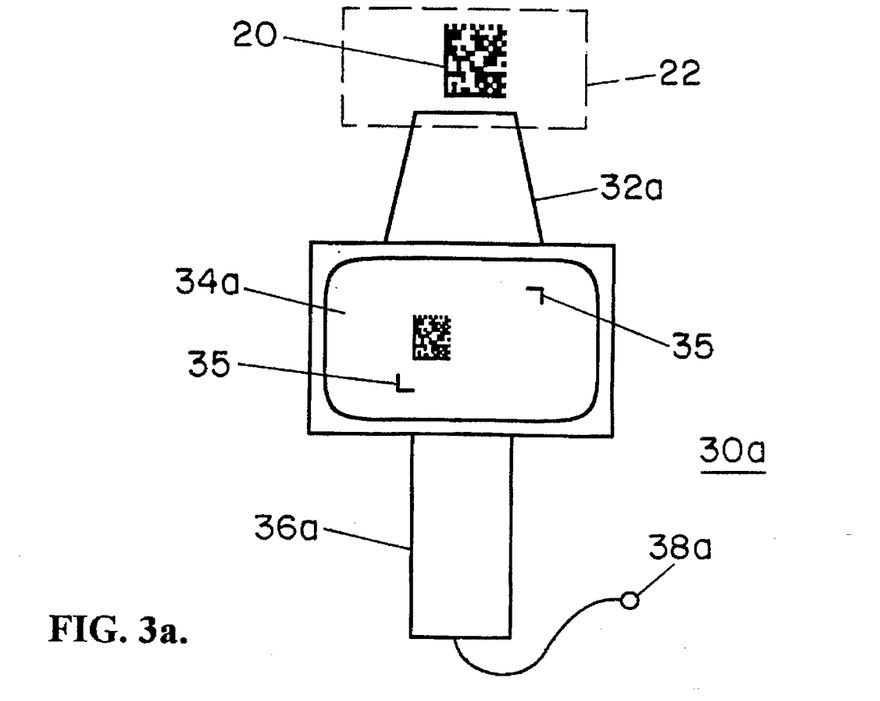
FIGS. 3a and 3b illustrated a form of hand-held decoding system of the type shown in FIG. 2.
Figure 3B:
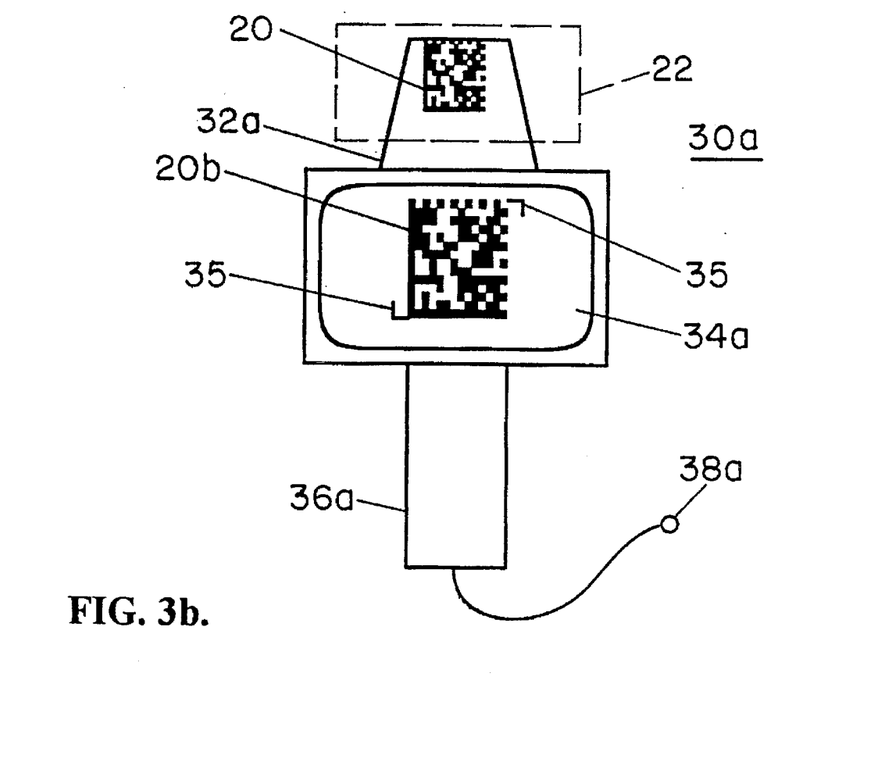

An image unit, shown as display unit 34, is arranged to display a visual representation of the dataform in response to the electrical signals provided by the reader unit 32. Display unit 34 may utilize a suitable form of display such as listed with reference to display unit 16. FIG. 3a provides a simplified drawing of a hand-held visually interactive decoding system shown as decoder 30a. In FIG. 3a reader unit 32a represents a code scanner portion arranged for reading dataform 20 by use of laser, CCD, CMOS or other scanning method. As illustrated, decoder 30a includes display 34a which displays a visual representation 20a of the dataform 20 which is not centered and which represents an image of dataform 20 that is too small for effective, high reliability decoding. Visual guide marks 35 provided on the display can be used as size and centering aids. Thus, in FIG. 3a the reading performance characteristics (e.g., relative alignment and distance between dataform 20 and decoder 30a) have not been optimized. Other examples would include alignment such that the dataform appears partially outside of the guide marks 35, out of focus, etc. FIG. 3b shows the decoder 30a and dataform 20 after the user has changed the relative alignment and distance. In FIG. 3b the visual representation 20b of the dataform 20 is larger and centered to fall within the guide marks, permitting the decoding unit 36a, which is contained within the handle portion of decoder 30a, to be activated. Activation can result from operator use of a switch or button. Alternatively, decoder 30a can be arranged to be automatically self activating at a time when a reliable reading of the dataform is achieved.

Corresponding to the decoding unit 36a referred to in the context of FIG. 3b, the FIG. 2 decoding system includes decoding unit 36 arranged to decode the electrical signals representative of the dataform 20 to provide output signals representative of the entry data encoded in the dataform. The output signals from decoder 36 are made available at output port 38 for coupling to a computer input or other utilization equipment, and/or provided to data output unit 40 for printout or viewing of the entry data decoded from the dataform. Data output unit 40 may be a printer, display or other alphanumeric text presentation unit. In FIG. 3b, the output signals representative of the data decoded from dataform 20 are provided at port 38a for further utilization.

The discussion of the FIG. 2 decoding system in the form of the hand-held unit 30a of FIGS. 3a and 3b has been in the context of manual adjustment of the alignment and distance positioning of the reader unit 32a. In other embodiments, particularly where items bearing bar codes are moved past a stationary scanner, the scanner positioning can be adjusted remotely or automatically. In FIG. 2 there are included two interconnections for providing positioning commands or control signals from display unit 34 to reader unit 32. With this configuration, display unit 34 includes the additional capability of enabling the operator to enter adjustment information relating to adjustment of reading performance characteristics, at the display unit. Such adjustment information provided to reader unit 32 is then used to control reader or scanner alignment and lens adjustments by activation of mechanical, electrical or other activators to provide adjustments. Such performance adjustments can be automated by application of the bar code locating methods and algorithm described in patent application Ser. No. 08/069,546, entitled "Locating 2-D Bar Codes", filed Jun. 1, 1993, which has now been passed to issue. The entire disclosure of this co-pending application is hereby incorporated herein by reference. As disclosed in such application, the presence, alignment and size of a bar code can be automatically determined by analysis of data derived from scanning an area (e.g., a bit map or other electronic image storage arrangement) in which a bar code representation is included. Such determinations of bar code alignment and size can then be utilized to develop performance adjustments, such as scanner alignment and lens adjustment signals as discussed above. For present purposes, "reading performance characteristics"are defined as alignment, distance, focus, lateral positioning, magnification, reading duration, exposure time, orientation, scanning speed, resolution, and other characteristics relating to quality of performance in reading dataforms, and any one or more of which may be adjustable with respect to a reader or scanner used in a particular application.

In the encoding and decoding systems of FIGS. 1 and 2 there are thus provided systems enabling interactive operation. In the encoding system the operator can actively observe the insertion and editing of data in a dataform format by action to accomplish one or more of add/modify/delete entry data in order to achieve an appropriate or optimum dataform content, utilization, size, etc. Visual or automatic interactive operation is also enabled for the FIG. 2 decoding system. As already discussed, by observation of the image of the scanned dataform, the operator can adjust reading performance characteristics in operation of the scanner to achieve successful decoding without the necessity of trial and error attempts at effective dataform scanning. With the benefit of the resulting visually interactive scanning the operator can be expected to become increasingly skilled in scanner alignment and distance placement so that time savings will be realized through faster and more accurate decoding on a first time basis.

OPERATION

Figure 4:
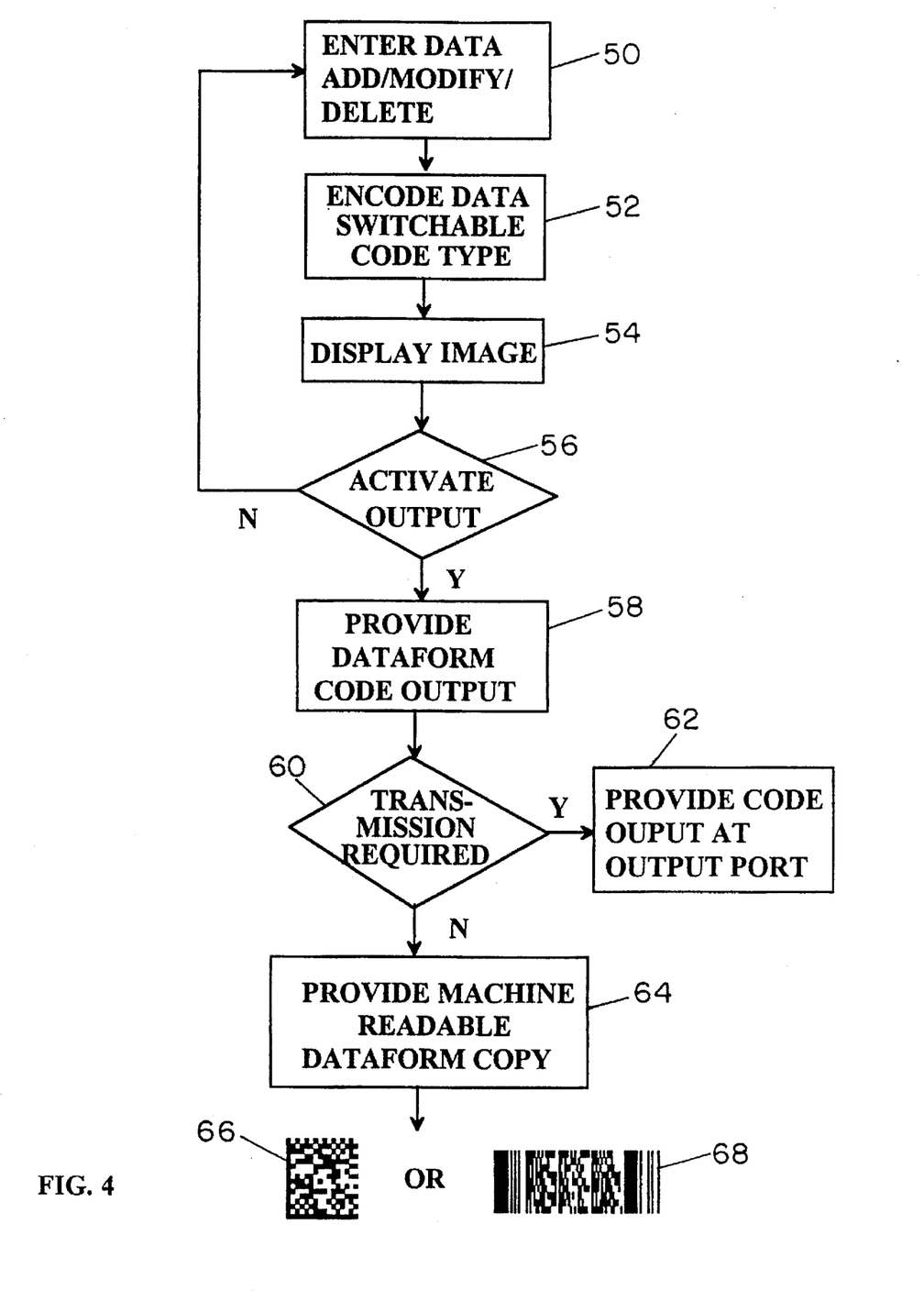
FIG. 4 is a flow diagram of steps in operation of the FIG. 1 system.

Referring now to FIG. 4, there is shown a flow diagram of a sequence of steps performed in encoding a dataform pursuant to a visually interactive encoding method in accordance with the invention. In first step 50 entry data is entered via a keyboard, digitizer, or scanner, for example. Step 52 comprises encoding the entry data to provide code signals representative of a machine readable dataform, such as a two-dimensional matrix code graphic form. Displaying of a visual representation of the dataform, based upon the step 52 code signals, takes place in step 54. FIG. 5a shows, at the bottom, an indication of entry data comprising "This i" and at the top a visual representation (on a cathode ray tube, or liquid crystal display, for example) of a bar code incorporating the entry data "This i".

Figure 5B:
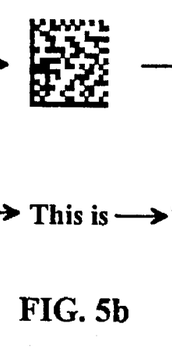
Figure 5C:
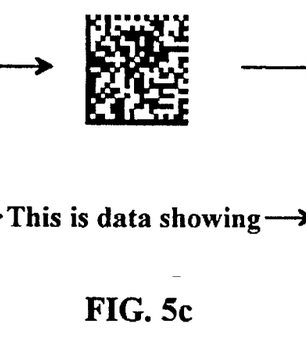
Figure 5D:
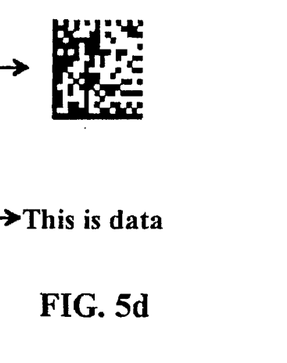
Figures 6A, 6B:
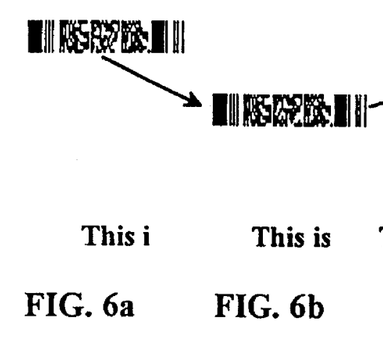
FIGS. 6a–6d illustrate interactive encoding of a two-dimensional bar code.
Figures 6C, 6D:
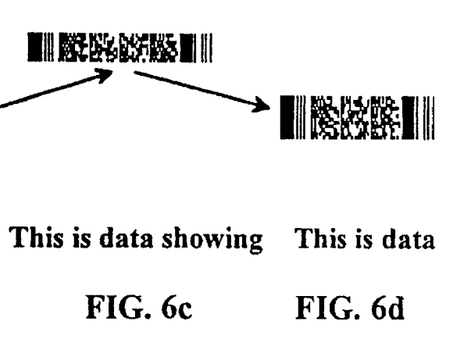

In step 56 the operator chooses one of the following, either edit the dataform or activate code signal output. In editing the dataform the operator is returned to step 50 and enabled to implement changes in the entry data including at least one of add/modify/delete entry data. FIG. 5b illustrates a "modify" change. With both entry data (lower portion) and the visual representation of the resulting matrix code dataform (upper portion) shown on the display (16 of FIG. 1), the operator realizes that "is" has not been correctly entered, modifies the entry data from "This i" to "This is" and observes the altered matrix code. Then, as represented in FIG. 5c, the operator implements an "add" change by entering the words "data showing" as additional entry data and observes the altered matrix code representation in the upper portion of FIG. 5c. At this point the operator decides that it is preferable to exclude the word "showing" from the dataform and implements a "delete" change. FIG. 5d shows the result with the "showing" portion of the entry data deleted and the altered bar code matrix represented in the upper portion. FIGS. 6a-6d are corresponding illustrations of editing of a two-dimensional bar code type of dataform.

Two points should be noted. This is a simplified example of editing which can, in practice, encompass much more extensive text, numerical and symbolic (as will be referred to further) data modification, deletion and addition. In operation of the invention in a presently preferred embodiment the updating of the bar code or other dataform is continuous as each change is made. Thus, considering the example of a word processing program used on a computer, each time the secretary touches a letter key the associated letter is added to the displayed text. Similarly, in this embodiment of the present encoder the altered bar code is updated by the encoding unit 14 after each change (addition or deletion of a letter, etc.) and a visual representation of the altered bar code is updated and displayed in real time. As a result, the operator is enabled to perform on a fully visually interactive basis in entering data and editing the resulting dataform to efficiently reach the desired result with a minimum of trial and error delay and false starts. Whatever trial and error activity may be necessary in order to evaluate possible alternative changes can be accomplished on an instantaneous entry and visual feedback basis.

Referring back to FIG. 4, as noted step 56 encompasses the two options of activating the dataform output or editing. Choice of the "No" path and implementing of one or more add/modify/delete changes in step 50 results in encoding (in repetition of step 52) modifications to the entry data reflecting the editing changes, in order to provide code signals representative of an altered dataform (as already discussed with reference to FIGS. 5a-5d). As further discussed, in repetition of step 54 the altered dataform representation is displayed for viewing. At this point, step 56 is repeated, enabling the operator to implement either further editing changes or activation of code signal output. If, at this point, the operator elects not to make further editing changes to the dataform, operation proceeds through to step 58. In step 58 the final code signals provided in step 52 (after editing is completed) are provided as output signals for further utilization as appropriate. The method may also include step 60 which is responsive to whether utilization of the output signals is to take the form of providing the dataform fixed in a machine readable copy or whether utilization takes the form of providing the code signals for the dataform at an output port at step 62 for coupling to equipment such as a computer or fax machine for further utilization. In the former case, the dataform code signals are utilized in step 64 to provide the dataform fixed in a machine readable copy (e.g., matrix code 66). As discussed, such machine readable copy may take any appropriate form via printing, magnetic recording, recording on film, etc.

Referring back to step 52, in a preferred embodiment of the invention step 52 encompasses encoding the entry data in a choice of two or more dataforms (e.g., a matrix code or a 2-D bar code) on a switchable basis. Thus, with the entry data available in storage as entered and displayed in encoded dataform format in real time as entered, the operator is enabled to determine the preferred dataform type on a case by case basis and to switch back and forth between the available dataform types at any time during or after the data entry process, prior to activation of the dataform output option. As indicated at the bottom of FIG. 4, this permits providing a machine readable dataform copy in either the matrix code or bar code format. By providing parallel alternative decoding capabilities in accordance with established protocols for different dataforms in data encoding unit 14 of FIG. 1, as many alternative dataform options as desired can be provided for on a switchable selection basis.

Figure 7:
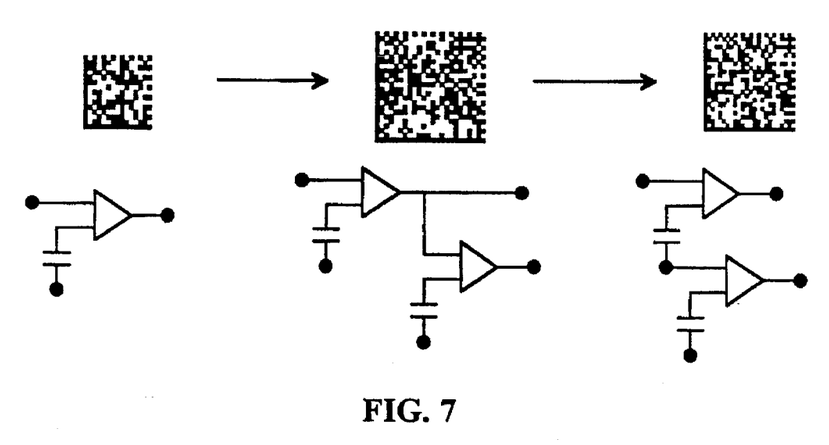
FIG. 7 illustrates interactive encoding of symbolic input data.

FIG. 7 illustrates the entry and updating of symbolic type data on a continuously updated and observable basis as discussed above for text. The FIG. 7 type entry data, here shown as portions of a circuit diagram, can be entered by use of a digitizer or CAD/CAE data entry unit, with resulting dataform development observed in real time as the data is entered.

Figure 8:
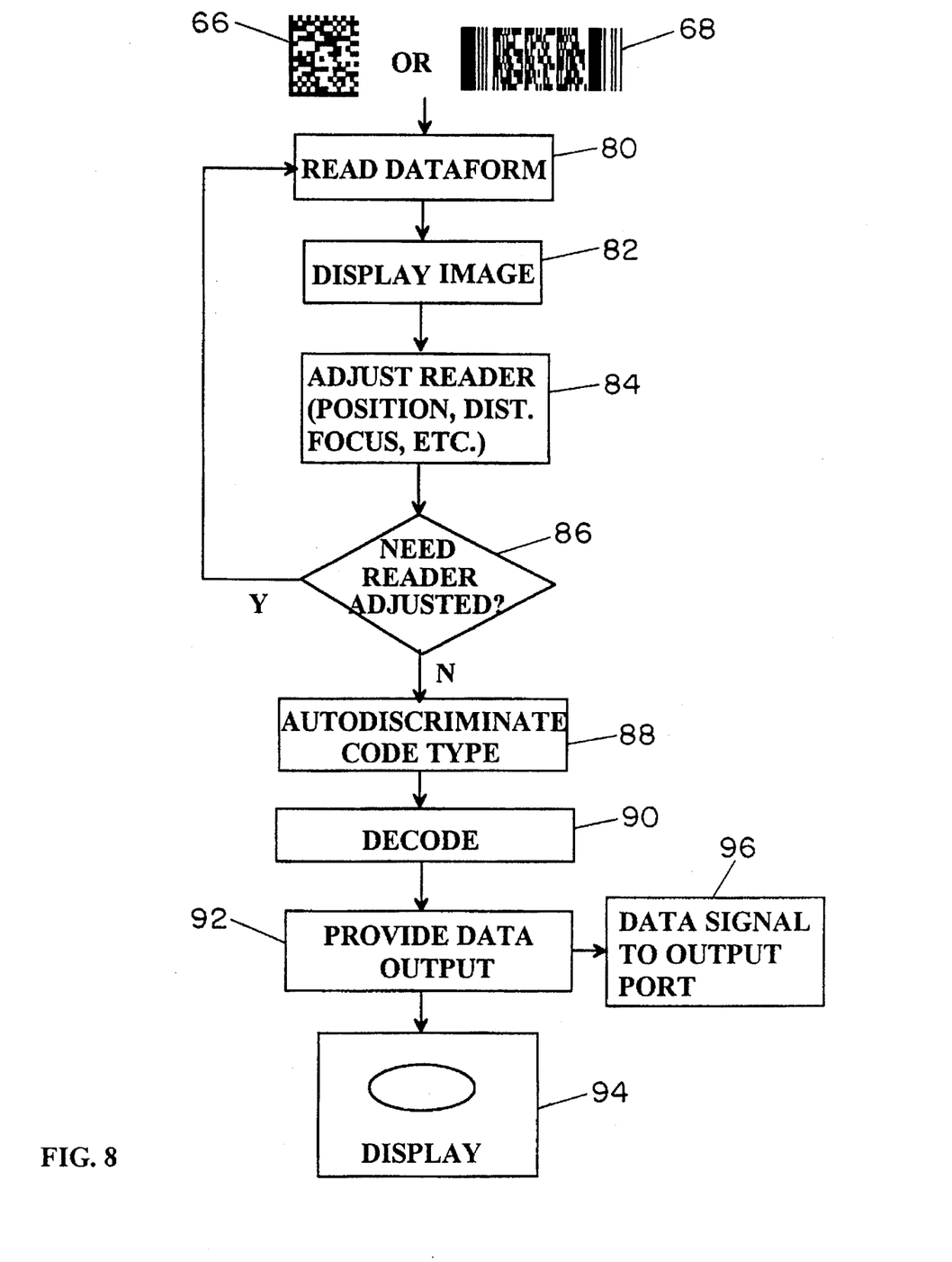
FIG. 8 is a flow diagram of steps in the operation of the FIG. 2 system.

FIG. 8 is a flow diagram illustrating a sequence of steps performed in decoding a dataform pursuant to a visually interactive decoding method in accordance with the invention. In step 80 a dataform reader is utilized to read at least a portion of a dataform (e.g., bar code 20) to provide electrical signals representative of the scanned portion. As discussed with reference to FIG. 3a, this can be done by use of a laser scanner, CCD scanner or CMOS scanner. The reference to "at least a portion of a dataform" reflects the fact that, as discussed with reference to FIG. 3a, the initial scanning may be carried out with a positioning such that the scanning fails to fully encompass the entire area of the dataform matrix. Displaying of a visual representation of the scanned portion (part or all) of the dataform, based upon the step 80 electrical signals, occurs in step 82. This enables the operator to identify the target dataform area and determine if changes in the reading relationship (e.g., positioning, scanning distance, etc.) between the reader and the dataform are appropriate, as already referred to in discussion of FIG. 3a. It should be noted that in cases in which the dataform is recorded on a magnetic strip, in invisible ink or in other form not resulting in a viewable graphic image, any appropriate visual representation may be displayed in order to enable the operator to identify the target dataform area and to make appropriate reading relationship adjustments in order to adjust reading performance characteristics as previously defined.

In step 84 the operator either introduces reading relationship adjustments or does not. Step 86 encompasses the two possible responses in step 84. In response to implementing reading relationship adjustments (e.g., one or more of reader position, distance, orientation, focus, etc.) the "Yes" path results in repetition of step 80 to read the dataform with the newly adjusted reading relationship. The visual representation of the scanned dataform is then again provided at step 82 to enable the operator to evaluate the reading relationship of the reader unit to the dataform. If the display shows the reading relationship to be satisfactory, decoding of the dataform is activated by the operator or by the decoder automatically. In a preferred embodiment, the display is provided on a continuous basis so that any change in alignment or distance or other factors of the reading relationship is presented on an instantaneous real-time basis as changes occur. On activation of decoding in step 84, by pressing a switch or button or automatically, autodiscriminate step 88 is activated via the "NO" path of step 86. In step 88 a determination is automatically made as to the type of dataform (e.g., matrix code 66 or bar code 68) represented by the pixel image data resulting from scanning of the dataform of interest in step 80. Thus, decoder 36 of FIG. 2 is arranged to recognize pertinent characteristics of different dataforms of interest and thereby identify the particular type of dataform represented by the pixel image data at hand at any particular time. Decoder 36 is also equipped to apply the decoding protocol appropriate for the identified dataform type. Alternatively, the operator may select the appropriate decoding protocol by adjustment of decoder 36 in step 90, after viewing the dataform in step 82 and visually recognizing the type of dataform at hand.

With either the autodiscriminate or operator selection of code type, in step 90 the electrical signals from step 80, which are provided from the final reading relationship relative to the dataform, are decoded to provide output signals representative of entry data originally encoded in the dataform. Such decoding is carried out using the protocol appropriate for the form of a particular type of dataform and in accordance with the design, coding and decoding characteristics and specifications associated with such dataform. Following decoding, the output signals representative of the entry data may be utilized via step 92 to provide a printed or displayed visual presentation of the entry data in step 94 and/or provided at an output port in step 96 for coupling or transmission to a computer or other equipment for storage, transmission, analysis or other use or application.

In the implementations of the invention as discussed above, the method may be further automated. Thus, step 82 may encompass automatic analysis of the reading relationship between a scanner and a dataform using electronic image analysis, with the coupling of adjustment information to the scanner for adjustment of the reading performance characteristics (e.g., scanner magnification, alignment, orientation, focus, distance, etc.). Also, step 82 may encompass automatic recognition of a dataform image of acceptable size, centering, resolution, etc. and activation of autodiscriminate step 88 and decoding step 90 upon such recognition of an acceptable dataform image.

A particular example of application of the invention is illustrative of benefits provided. In many activities a typist enters text and numerical data in a memo, purchase order or other document which is to be mailed or otherwise transmitted to a remote location. At the second location the document will be read by a different individual and it may also be desired to enter text or data from the document into a computer for further processing. By use of the invention, in the form of data processing equipment incorporating a data encoding unit coupled to the data processing display, the typist entering text and data observes the text and data as entered and can simultaneously observe on the same display a dataform being encoded in real time with the same text and data. Thus, with reference to FIGS. 5a–5d, as the typist enters information each additional character appears as a letter or number and is also encoded into the dataform. For example, if a memo is being typed, the dataform can be presented at the upper right corner of the screen with the human readable text below. Then, when the typist is finished, both text and dataform can be printed out on the same sheet of paper. After facsimile transmission to a remote point, the recipient can read the document and also readily enter the content into a local computer by use of a bar code reader. The information is thus immediately available for further computer utilization on a highly accurate basis from the dataform and is not dependent upon less accurate OCR type scanning of the text.

While there have been described the currently preferred embodiments of the invention, those skilled in the art will recognize that other and further modifications may be made without departing from the invention and it is intended to claim all modifications and variations as fall within the scope of the invention.

What is claimed is:

1. A visually interactive method for decoding a machine readable dataform, comprising the steps of:

(p) utilizing a reader to read at least a portion of a dataform fixed in a machine readable copy, to provide electrical signals representative of at least said portion of said dataform;

(q) viewing a dynamic display providing visual guide marks viewable with a visual image of at least said portion of said dataform, in response to said electrical signals:

(r) utilizing said visual guide marks to visually determine whether said visual image of said dataform has at least a predetermined minimum size and is centered within said dynamic display, and implementing one of the following (i) changing the reading relationship between said reader and said dataform and (ii) activation of decoding via step (t);

(s) in response to a change in said reading relationship, repeating steps (p), (q) and (r); and (t) in response to activation of decoding, decoding said step (p) electrical signals to provide data output signals representative of entry data encoded in said dataform.

2. A method for decoding as in claim 1, additionally comprising the step of presenting a visual representation of said data encoded in said dataform responsively to said data output signals.

3. A method for decoding as in claim 1, additionally comprising the step of presenting a visual representation of said data encoded in said dataform responsively to said data output signals and wherein said visual representation of said data is provided for viewing with said step (q) visual image.

4. A method for decoding as in claim 1, wherein step (r) additionally includes selecting a decoding protocol based on visual identification of the type of dataform viewed in said visual image.

5. A method for decoding as in claim 1, wherein step (p) comprises utilizing a scanner to read at least a portion of one of the following: a matrix code, a bar code.

6. A method for decoding as in claim 1, wherein changing said reading relationship between said reader and said dataform in said step (r) includes changing one or more of the following: alignment, lateral positioning, distance, focus, magnification, reading duration, exposure time, orientation, scanning speed, resolution.

7. A method for decoding a machine readable dataform, comprising the steps of:

(p) utilizing a reader to read a dataform fixed in a machine readable copy, to provide electrical signals representative of said dataform;

(q) viewing a dynamic display providing visual guide marks viewable with a visual image of said dataform in response to said electrical signals;

(r) utilizing said visual guide marks to visually determine whether said visual image of said dataform has at least a predetermined minimum size and is centered within said dynamic display, and implementing one of the following (i) changing the reading relationship between said reader and said dataform and (ii) leaving said reading relationship unchanged, if acceptable;

(s) in response to a change in said reading relationship repeating steps (p), (q) and (r); and (t) automatically decoding said step (p) electrical signals when said reading relationship is acceptable, to provide data output signals representative of data encoded in said dataform.

8. A method for decoding as in claim 7, wherein changing said reading relationship between said reader and said dataform in said step (r) includes changing one or more of the following: alignment, lateral positioning, distance, focus, magnification, reading duration, exposure time, orientation, scanning speed, resolution.

9. A method for decoding as in claim 7, wherein step (r) additionally comprises visually determining the type of dataform viewable in said visual image and selecting a decoding protocol suitable for that type of dataform.

* * * * *